United States Patent Office 2,861,639
Patented Nov. 25, 1958

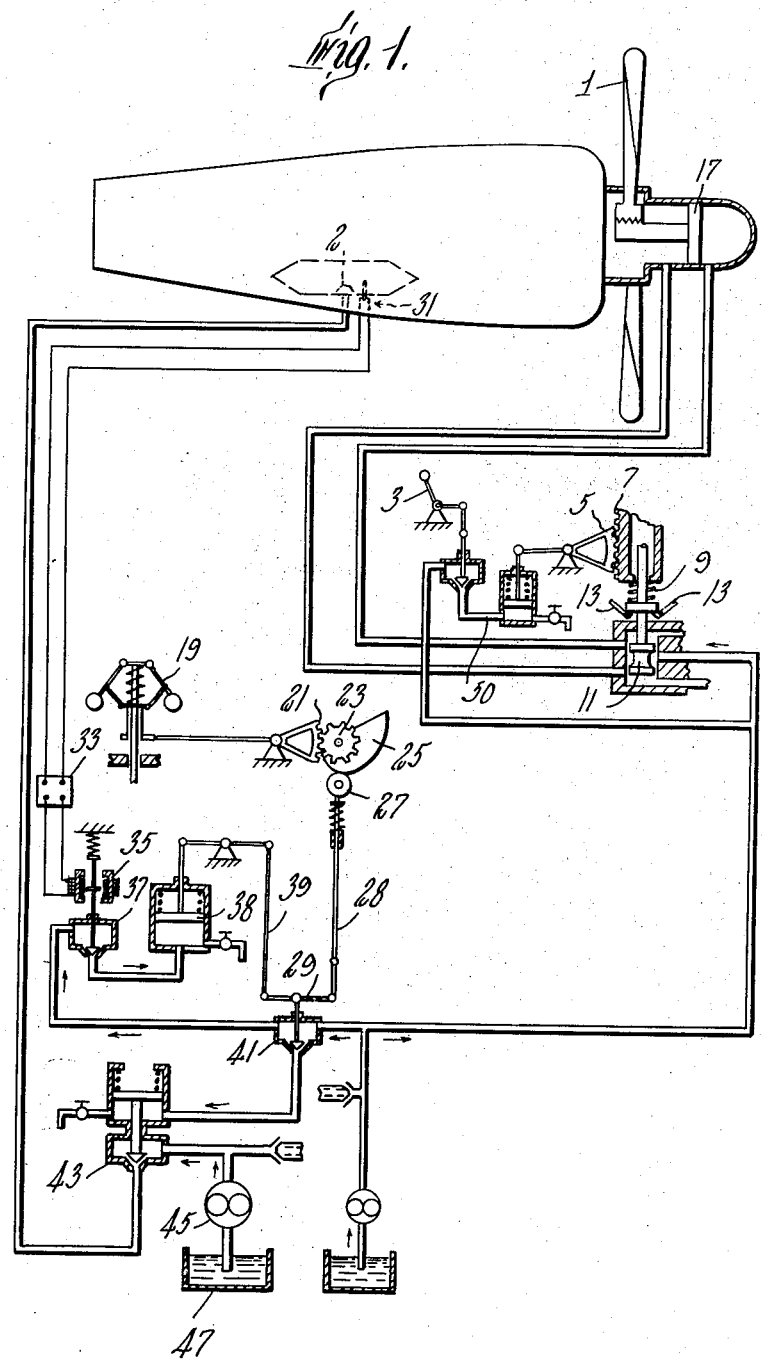

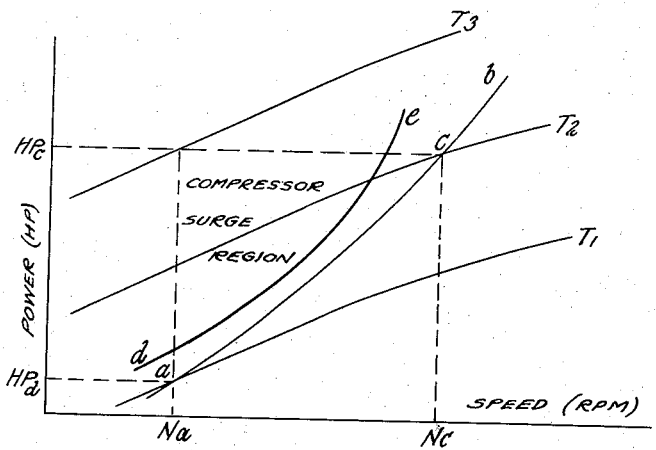
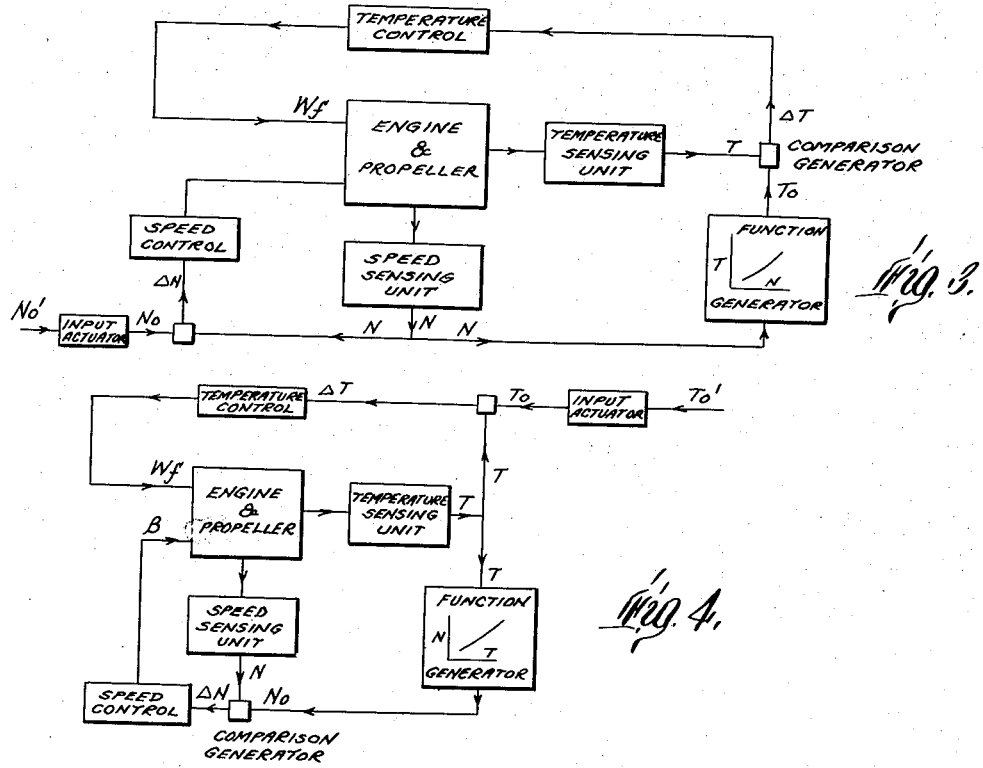

2,861,639

AIRCRAFT POWER PLANT SYSTEM

Robert A. Grosselfinger and Jacques J. Schoch, Washington, D. C., assignors to Grovar, Incorporated, Washington, D. C., a corporation of Delaware Application May 21, 1957, Serial No. 660,548

2 Claims. (Cl. 170—135.74)

This invention relates to gas turbine powered aircraft, and more particularly to power plant systems for propeller driven aircraft in which the propeller is driven by a gas turbine power plant.

With aircraft employing gas turbine power plants, it is desirable that the power plant be operated at as high efficiency as possible, since it is known that fuel consumption rises at a tremendous rate if the turbine power plant is not so operated. However, the most efficient operation of a turbine power plant frequently takes place in a region of compressor operating characteristics close to that region in which the phenomenon of "compressor surge" takes place, such "compressor surge" resulting in a completely uncontrolled operation of the turbine power plant which frequently causes structural failure.

Hence, the operation of a gas turbine near the region of its greatest efficiency has heretofore been a problem in the art even with the best of control systems, and it has been universal practice to operate a turbine in a region well removed from "compressor surge" phenomena so that there was no danger of such occurring, the penalty of lower efficiency and higher fuel consumption being considered a necessary evil, or so called limiters have been added to the control system having the function of limiting the fuel input to the engine whenever it is approaching the surge region.

Accordingly, it is an object of the present invention to provide a turbine power plant system control for gas turbine aircraft which will for the first time follow closely a predetermined operating line even if this operating line should be close to the surge line, thus resulting in greatly increased efficiency and lower fuel consumption with its consequent increase in aircraft range or pay load.

It is a feature of the invention that by its use turbine power changes may be made without any danger of entering the "compressor surge" region of turbine operating characteristics so that turbine power and speed changes may freely be made without danger of the engine running uncontrolled with resultant danger of structural failure thereof.

It is a further feature of the invention that by its use power plant control connecting linkages between the cockpit and the turbine, such as throttles and the like, are entirely eliminated, thereby greatly simplifying power plant installation.

For the purpose of fully describing preferred embodiments of the invention, reference is now made to the following specification together with the accompanying drawings in which:

Fig. 1 is a diagrammatic view of a turbo-prop power plant control system embodying the invention;

Fig. 2 is a graph representing performance characteristics typical of the turbine power plant of Fig. 1;

Fig. 3 is a block diagram of the system of Fig. 1; and

Fig. 4 is a block diagram of a system somewhat modified from that of Fig. 1.

Referring first to Fig. 1, the invention may be used with any one of a number of types of gas turbine power plants known to the art, that shown in Fig. 1 being of the type having one compressor and one turbine mechanically connected. In such a turbine power plant, atmospheric air enters the compressor where it is compressed to some desired pressure. The compressed air then passes to the combustion chamber where fuel is introduced through a fuel nozzle 2 and is burned in the compressed air to attain a desired turbine inlet temperature. The combustion gases and excess air are then expanded in the turbine to provide the power required to drive the compressor and to provide excess power which is utilized to drive the propeller.

The propeller provided is of the usual type having controllable pitch blades 1. The pitch of said blades may be controlled by a pilot lever 3 which is connected through an actuator and a suitable linkage to a toothed quadrant member 5 which, through the rack 7 and governor spring 9 imposes a force on the pilot valve 11. The applied force is balanced during steady state operation by a force available due to the rotation of the flyballs 13. It may be seen that at any time the force produced by the flyball 13 is either more or less than the imposed force resulting from the spring compression, and a displacement of the pilot valve 11 will result in either admitting servo fluid to the right side of the actuator piston 17 and draining from the left side or vice versa, in either case effecting a change in pitch of the propeller blades 1. Thus, any speed error resulting either from the power plant or the pilot will cause the blade angle to change until the speed error is reduced to zero. Such controllable pitch propellers using the speed control means herein described are well understood in the aircraft power plant system art and need not herein be further explained, with the exception of the input actuator 50, the purpose of which will be explained later.

For complete understanding of the subject matter of the present invention, the concepts of an engine operating manipulated variable and of an engine operating characteristic must be defined in accordance with their specific meanings as hereinafter used to define applicants' invention. Accordingly, the term "engine operating manipulated variable" is defined as a quantity which is determined by manipulating it from outside the engine, either manually or by a control, typical examples thereof being fuel flow and propeller blade angle. On the other hand, the term "engine operating characteristic" is a quantity which is determined or generated by the engine itself, such as, for instance, turbine inlet temperature, engine speed, or compressor pressure ratio, which cannot be directly determined or controlled except through one or more engine operating variables. Thus, the engine operating manipulated variables indirectly control the engine operating characteristics generated by the engine, but such engine operating characteristics cannot themselves be directly controlled, nor can the manipulated variables be generated by the engine. Neither fuel flow nor propeller pitch, then, can under any circumstances operate as engine operating characteristics.

In applying these definitions to the usual gas turbine-propeller system, an engine operating characteristic which may be selected is engine speed, and such speed may be indirectly controlled by varying the propeller blade angle as an engine operating manipulated variable.

The heretofore known conventional control system for such a power plant consisted of a speed control mechanism of the type described above, as well as a temperature control acting in parallel with the speed control. The control for the temperature, the engine operating characteristic, in such a system consisted of a temperature sensing device, the output of which was compared to a desired temperature and the engine operating variable, fuel flow, was manipulated until such time as the error between desired temperature and actual temperature was reduced to zero.

In Fig. 2 is shown a graphical representation of the performance characteristics typical of the above-described type of turbine power plant wherein the horsepower output of the power plant is plotted against the power plant speed with turbine inlet temperature plotted as parameter.

Referring now to the conventional control system, as above described, assume point ($a$) on the graph of Fig. 2 to be the initial steady state power point. If a higher power was desired, the pilot by simultaneously operating the speed control lever and the temperature control lever, could attain a range of power output with some desired relationship between power plant speed and turbine inlet temperature corresponding, for example, to the line $a$—$b$ of Fig. 2. In such a case, the input to both controls could be accomplished simultaneously by establishing the desired relationship between the two variables on suitable cams related to each other in such a way as to accomplish the relationship defined by line $a$—$b$ of Fig. 2.

Although such a system permitted the control of the overall power plant system in accordance with any arbitrarily selected operating line, such as, for example, line $a$—$b$ of Fig. 2, it in no way defined the transient characteristics between two such points, and thereby permitted combinations of speed and temperature during a transient which frequently encroached on the turbine "compressor surge" line, shown as line $d$—$e$ on Fig. 2, thereby jeopardizing safe operation as heretofore explained. Hence, to avoid the "compressor surge" line, it was considered good practice both to operate the turbine in a region well removed therefrom or to employ limiting devices to superimpose a limiting function upon the normal control function. Such limiting devices were necessarily complex since the "compressor surge" line varies its location with different airplane operating conditions, particularly with respect to altitude.

As a more detailed example of heretofore known practices, consider an increase in power from $HP_a$ to $HP_c$. In such case, increased speed and temperature demand signals were simultaneously introduced to the speed and temperature controls respectively. As the result, a positive speed error was introduced which, through a speed control system similar to that shown in Fig. 1, caused a momentary decrease in blade angle thereby unloading the power plant and permitting it to accelerate. Simultaneously, the positive temperature error caused an increase in fuel flow which raised the turbine inlet temperature thereby elevating the energy level to the turbine and further caused the power plant system to accelerate. When the speed neared the desired speed, an increase in blade angle was automatically accomplished in order to absorb the higher power available with the higher turbine inlet temperature at the higher speed. During such a transient there was no correlation whatsoever between instantaneous values of turbine inlet temperature and speed and the transient will take place along any line, the shape of which will depend, among other things, upon the relative speeds of the response of the two loops and during a transient, combinations of speed and temperature are possible, which will encroach on the compressor surge line.

According to our invention, we employ gas turbine power plant system control means, for example, including a function generator of mechanical or other type, responsive to changes in at least two selected turbine power plant operating characteristics to maintain a predetermined relationship therebetween by controlling the fuel flow to the turbine or some other engine operating manipulated variable. Thus, the turbine power plant is automatically controlled in accordance with any desired relationship, such as line $a$—$b$ of Fig. 2, for example, during transient as well as steady state operation since one variable is controlled as a function of the other. The turbine power plant system engine operating characteristics, any two of which may be employed for its control, are as above set forth in more detail, for example, turbine speeds, temperature, pressures and combinations thereof, which characteristics are varied indirectly by changes in engine operating manipulated variables as above set forth in more detail, for example, turbine load or fuel flow. Thus, by our novel turbine power plant system, which term is intended to include the turbine-propeller system as well as factors other than normal engine operating controls which affect the load thereon, we have made possible the elimination of any encroachment into the "compressor surge" region while permitting turbine operation closely adjacent thereto for optimum efficiency. Furthermore, with our novel arrangement, the turbine power plant and its associated controls may be made as a complete unit unconnected with the propeller blade pitch or speed control and yet at the same time provide for automatic operation.

In general, the novel gas turbine power plant control system of our invention includes both a manually variable control system and an automatically variable control system, both comprising information feedback loops including the power plant therein. The loops otherwise are not connected except on a time basis, as is essential for best adherence to the predetermined line of operating relationship between the two selected engine operating characteristics establishing the range of power output along said line. That is, the loops are constructed and arranged to have a predetermined rate of information input to the manually variable control system loop such that the predetermined rate of operation of the automatically variable control system is at least as fast as and preferably somewhat faster than the rate of operation of the manually variable control system when information, as by displacement of a pilot's operating control is fed into the manually variable control system loop to select a desired point for engine operation. By so interrelating the operation of the two feedback control loops of the control system of the invention, the maintaining of said engine operating characteristics substantially along said predetermined line of operating relationship during a change in power to said desired operating point on said line of operating relationship and the providing of substantial adherence to said line during a power change is made possible.

The manually variable loop in general includes control means for directly varying one engine operating variable to be controlled, sensing means for sensing the engine operating characteristic to be established and maintained, and feedback means, such as a governor, between these two elements, to maintain said selected engine operating characteristic at a selected value defining a desired power output. The governor itself has manually or otherwise operable information input means for selecting a desired value of said engine operating characteristic and, in general, an input actuator is used to introduce a time lag and so limit the maximum rate of information input in accordance with the principles of the invention, that is, the rate at which the manually operable control system can operate is limited to a rate no greater than the maximum rate at which the automatically operable control system can respond. Thus, during a transient the automatically operable control can follow the manually operable control closely and at the same rate so that substantial adherence to the predetermined operating line is achieved.

The automatically variable loop in general includes a pair of sensing means and suitable interconnecting means, as hereinafter more fully described, for comparing the output of one in terms of the other in accordance with the predetermined line of operating relationship to control the other selected engine operating manipulated variable, both to maintain the engine operating conditions at the selected point defining a desired power output and, during power changes, to provide adherence to the predetermined line of operating relationship by operation of said loop at a rate at least as fast as the rate of operation of the manually controlled loop.

Referring again to Fig. 1, and especially to the automatically variable control portion of the power plant control means therein shown, a conventional flyball governor 19 is driven through suitable gears by the turbine power plant and provides a speed sensing device for said power plant, which speed is a typical turbine engine operating characteristic which may be selected for its control. Movement of the sleeve of such governor (which movement is proportional to the speed of the power plant) is transmitted through a suitable linkage to the toothed quadrant member 21 which engages a rotatably mounted pinion 23. A cam 25 mounted on a common shaft with said pinion is provided as a function generator, such cam defining a predetermined relationship between the turbine power plant speed and the turbine inlet temperature as a second turbine engine operating characteristic to provide a desired operating relationship between such selected engine operating characteristics as shown by the line $a$—$b$ in Fig. 1, for example, so that movement of cam follower 27 associated with such cam 25 is in terms of the turbine inlet temperature of said power plant, such movement being transmitted through linkage 28 to one end of comparison generator arm 29. Other turbine engine operating characteristics, as set forth above, could similarly be employed for turbine control.

The turbine inlet temperature is sensed by a thermocouple 31, the output of which is amplified by amplifier 33 and fed to a positioning solenoid 35 which directly controls the position of the pilot valve 37. The resulting displacement of servo piston 38 is directly proportional to the actual measured temperature and such displacement is provided at the other end of the comparison generator arm 29 through a linkage 39. An actual temperature in excess of the computed temperature provided by function generating cam 25 will result in a lowering of the center of the comparison generator arm 29 thereby closing the pilot valve 41 and causing the fuel valve 43 to close, reducing fuel flow—the selected engine operating manipulated variable—supplied by the pump 45 from the fuel tank 47 to nozzle 2. Thus, the power plant's instantaneous speed is used to compute a correspondingly desired temperature through the function generating toothed quadrant 21, pinion 23, and cam follower 27, a displacement being provided at one end of the comparison generator arm 29 where such displacement is, in effect, added or subtracted from the displacement of said arm caused by the actual turbine inlet temperature linkage 39. As a result, any difference between actual turbine inlet temperature and the turbine inlet temperature computed as a function of turbine speed will cause the fuel flow to change to make the actual temperature correspond to the temperature computed from the instantaneous speed, and this will be so throughout any arbitrary relationship, such as line $a$—$b$ of Fig. 2, for example.

The manually variable control portion of the system of the invention, as above described, includes a generally well-kown controllable pitch propeller with a governor speed control, the latter having a lever 3 operable by a pilot to select a desired speed which will then be established and maintained by the system, without further attention by the pilot. However, in accordance with the principles of the present invention, as set forth above, it is essential that the input by the pilot's lever 3 be controlled as to rate in order that a speed change imposed by said input will be followed at the same rate by a temperature change, that is, that the rate of operation of the propeller pitch control be no greater than the rate of operation of the automatic control system as controlled by such temperature change. As shown in Fig. 1, this may be ensured by introducing a time lag, that is, by slowing down the input by means of a suitable input actuator 50 connected between the pilot's lever 3 and the governor mechanism. Such devices capable of introducing a time lag are generally well known in the art, and may be of various types, the type herein shown being of the fluid type comprising a valve operable by the pilot's lever 3 to position a spring-mounted piston by virtue of pressure differences imposed thereon by said valve and an orifice in the piston chamber.

It is the control of rate of information input, together with the automatic control provided by the function generator, which makes possible both adherence to a predetermined line of operating relationship during power transients and control by the pilot of the entire power plant system by a single control lever, any manipulation of such lever 3, by means of the propeller speed control system above described, establishing a desired power plant system speed by change in propeller blade angle. Furthermore, the system of the invention results in entirely eliminating the need for turbine "compressor surge" limiting devices as above described and, at the same time, permits the choice of a power plant operating relationship much closer to the "compressor surge" line, which is especially advantageous from a power plant efficiency standpoint.

The operation of the invention can perhaps be more clearly explained by means of the block diagram of Fig. 3. Again assuming the initial steady state point to be $(a)$ on Fig. 2, and that an increase in the power plant speed is accomplished by a positive input $N_0$. The error between $N_0$ and the measured speed N, $\Delta N$, is sensed by the speed control which manipulates propeller blade angle $\beta$ until such time as $N_0$ is equal to N thereby reducing $\Delta N$ to zero. The speed N is continuously determined by the speed sensing unit and is made available to the function generator which computes a temperature $T_0$ corresponding to the instantaneous values of N in accordance with some provided function such as the line $a$—$b$ of Fig. 2. At the same time, the temperature sensing unit determines the actual temperature T and the difference between T and $T_0$ or $\Delta T$ causes a change in fuel flow $Wf$ by means of the temperature control to reduce $\Delta T$ to zero. It may be seen that since temperature is controlled as a function of instantaneous speed, a given function generator will permit a power transient to take place in accordance with the temperature-speed relationship provided in the function generator.

Fig. 4 is a block diagram of a similar control system wherein the desired speed is computed through function generator means as a function of the actual turbine inlet temperature which is separately controlled as speed is in the case of Fig. 3, the propeller being automatically controlled by the speed and temperature through a function generator, and the fuel flow being controlled by a desired temperature as manually selected by a pilot's lever.

Other types of turbine power plants than the herein described single shaft turbo-prop power plant, even turbojet power plants with a variable area nozzle or other engine operating manipulated variable, may as well be used with the invention, for example, the type of turbine having a gas generator portion and a power turbine portion mechanically independent thereof and energized by the hot gases therefrom may be used, and with such a turbine, the selected operating characteristics may, if desired, be the speeds of each portion of the turbine, pressure ratio and temperature, speed of one portion of the turbine and temperature, or other combinations.

Thus it will be seen that by our invention we are for the first time enabled to operate the entire turbine power plant system along any predetermined operating relationship between selected power plant operating characteristics even during transient periods, for example, at maximum efficiency close to the "compressor surge" line without any danger of passing into the "compressor surge" region, and the power of said turbine will be automatically varied in accordance with said relationship by changes in speed of said turbine power plant.

This application is a continuation-in-part of our patent application Serial No. 418,518, filed March 24, 1954, now abandoned.

Various other modifications within the spirit of our invention and the scope of the appended claims and not herein described will be apparent to those skilled in this art.

We claim:

1. In a turbo-prop aircraft, a turbo-prop power plant having two engine operating variables comprising a variable fuel input and a controllable pitch propeller driven by said power plant for directly controlling the thrust thereof and for indirectly controlling two selected engine operating characteristics in accordance with a predetermined line of operating relationship between said selected engine operating characteristics establishing a range of thrust output along said line, a first sensing means connected to said power plant sensing a first selected engine operating characteristic of said turbine power plant, a second sensing means connected to said power plant sensing a second selected engine operating characteristic of said turbine power plant, fuel flow control means connected to said power plant changing the thrust of said power plant by varying said fuel input, propeller pitch control means connected to said propeller changing the thrust of said power plant by varying the pitch of said propeller, manually operable control means for one of said engine operating variables connected to one of said fuel flow control means and said propeller pitch control means establishing a predetermined value of one of said selected engine operating characteristics to define a desired operating point on said line of operating relationship, automatically operable control means for the other of said engine operating variables connected to said two sensing means and to one of said fuel flow and propeller pitch control means for directly varying said other operating variable in accordance with said predetermined line of operating relationship between said selected engine operating characteristics including function generator means establishing said predetermined line of operating relationship between said first and second operating characteristics, said function generator means being operatively connected to said first sensing means to provide an output in terms of the output of said second sensing means, comparison generator means connected to said function generator means, said second sensing means and said other of said fuel flow and propeller pitch control means comparing the output of said function generator and said second sensing means to provide a combined error signal output effective directly to control said other operating variable for changing the thrust of said power plant by varying the said other operating variable, and rate means interposed between said manually operable control means and said one of said fuel flow control means and said propeller pitch control means establishing a maximum rate of operation thereof no greater than the rate of operation of said automatically operable control means maintaining said engine operating characteristics substantially along said predetermined line of operating relationship during a change in thrust to said desired operating point on said line of operating relationship and providing substantial adherence to said predetermined relationship during a thrust change by control of the instantaneous value of said other operating variable by the instantaneous value of said one operating variable in accordance with said predetermined line of operating relationship.

2. In a turbo-prop aircraft, a turbo-prop power plant having two engine operating variables comprising a variable fuel input and a controllable pitch propeller driven by said power plant for directly controlling the thrust thereof and for indirectly controlling two selected engine operating characteristics in accordance with a predetermined line of operating realtionship between said selected engine operating characteristics establishing a range of thrust output along said line, a first sensing means connected to said power plant sensing a first selected engine operating characteristic of said turbine power plant, a second sensing means connected to said power plant sensing a second selected engine operating characteristic of said turbine power plant, fuel flow control means connected to said power plant changing the thrust of said power plant by varying said fuel input, propeller pitch control means connected to said propeller changing the thrust of said power plant by varying the pitch of said propeller, manually operable control means including propeller speed governor means connected to said propeller pitch control means establishing a predetermined value of one of said selected engine operating characteristics to define a desired operating point on said line of operating relationship, automatically operable control means for the other of said engine operating variables connected to said two sensing means and to said fuel flow control means for directly varying said fuel input in accordance with said predetermined line of operating relationship between said selected engine operating characteristics including function generator means establishing said predetermined line of operating relationship between said first and second operating characteristics, said function generator means being operatively connected to said first sensing means to provide an output in terms of the output of said second sensing means, comparison generator means connected to said function generator means, said second sensing means and said fuel flow control means comparing the output of said function generator and said second sensing means to provide a combined error signal output effective directly to control said fuel input for changing the thrust of said power plant by varying said fuel input, and rate means interposed between said manually operable control means and said propeller pitch control means establishing a maximum rate of operation thereof no greater than the rate of operation of said automatically operable control means maintaining said engine operating characteristics substantially along said predetermined line of operating relationship during a change in thrust to said desired operating point on said line of operating relationship and providing substantial adherence to said predetermined relationship during a thrust increase by control of the instantaneous value of fuel input in accordance with said predetermined line of operating relationship.

References Cited in the file of this patent

UNITED STATES PATENTS

| | | |
|---|---|---|
| 2,432,177 | Sedille | Dec. 9, 1947 |
| 2,536,158 | Chamberlin et al. | Jan. 2, 1951 |
| 2,750,734 | Anxionnaz et al. | June 19, 1956 |
| 2,759,549 | Best | Aug. 21, 1956 |